United States Patent [19]

Grob et al.

[11] Patent Number: 5,947,863
[45] Date of Patent: Sep. 7, 1999

[54] METHOD AND ARRANGEMENT FOR CONTROLLING THE INPUT TORQUE OF A TRANSMISSION

[75] Inventors: Ferdinand Grob, Besigheim; Martin-Peter Bolz, Oberstenfeld; Christian Schwientek, Weinsberg; Holger Huelser, Stuttgart, all of Germany

[73] Assignee: Robert Bosch GmbH, Stuttgart, Germany

[21] Appl. No.: 08/993,667

[22] Filed: Dec. 18, 1997

[30] Foreign Application Priority Data

Dec. 20, 1996 [DE] Germany .............................. 196 53 231

[51] Int. Cl.[6] .................................................. B60K 41/06
[52] U.S. Cl. ............................................ 477/109; 477/102
[58] Field of Search ................................ 477/92, 94, 102, 477/107, 109; 192/13 R

[56] References Cited

U.S. PATENT DOCUMENTS

| 5,050,452 | 9/1991 | Morioka .................................... 477/109 |
| 5,056,378 | 10/1991 | Aimone et al. .......................... 477/109 |
| 5,184,577 | 2/1993 | Kato et al. ................................ 477/109 |
| 5,265,498 | 11/1993 | Fodale et al. ............................ 477/109 |
| 5,362,285 | 11/1994 | Sano et al. ................................ 477/92 |
| 5,393,276 | 2/1995 | White et al. .............................. 477/107 |
| 5,679,093 | 10/1997 | Desautels et al. ....................... 477/109 |
| 5,830,104 | 11/1998 | Desautels et al. ....................... 477/109 |
| 5,842,376 | 12/1998 | Dresden, III et al. .................... 477/92 |

FOREIGN PATENT DOCUMENTS 4309903 5/1994 Germany .

*Primary Examiner*—Dirk Wright
*Attorney, Agent, or Firm*—Walter Ottesen

[57] ABSTRACT

The invention is directed to a method for controlling the input torque of a transmission mounted downstream of an internal combustion engine during a gear ratio changing operation of the transmission. The input torque is increased or decreased by pregiven measures beyond the value thereof present at the start of the shifting operation in dependence upon mode of shifting present. The method includes performing at least one of the following steps to realize at least one of the measures: actuating a device for changing the geometric characteristics of the exhaust-gas system of the engine; actuating the electromagnetic brake controlling the input torque of the transmission; switching in or switching out ancillary equipment driven by the engine; actuating the intake or exhaust valves of the engine to generate a negative combustion torque; and, if the engine is an engine having externally supplied ignition, advancing the ignition time point of the engine.

11 Claims, 10 Drawing Sheets

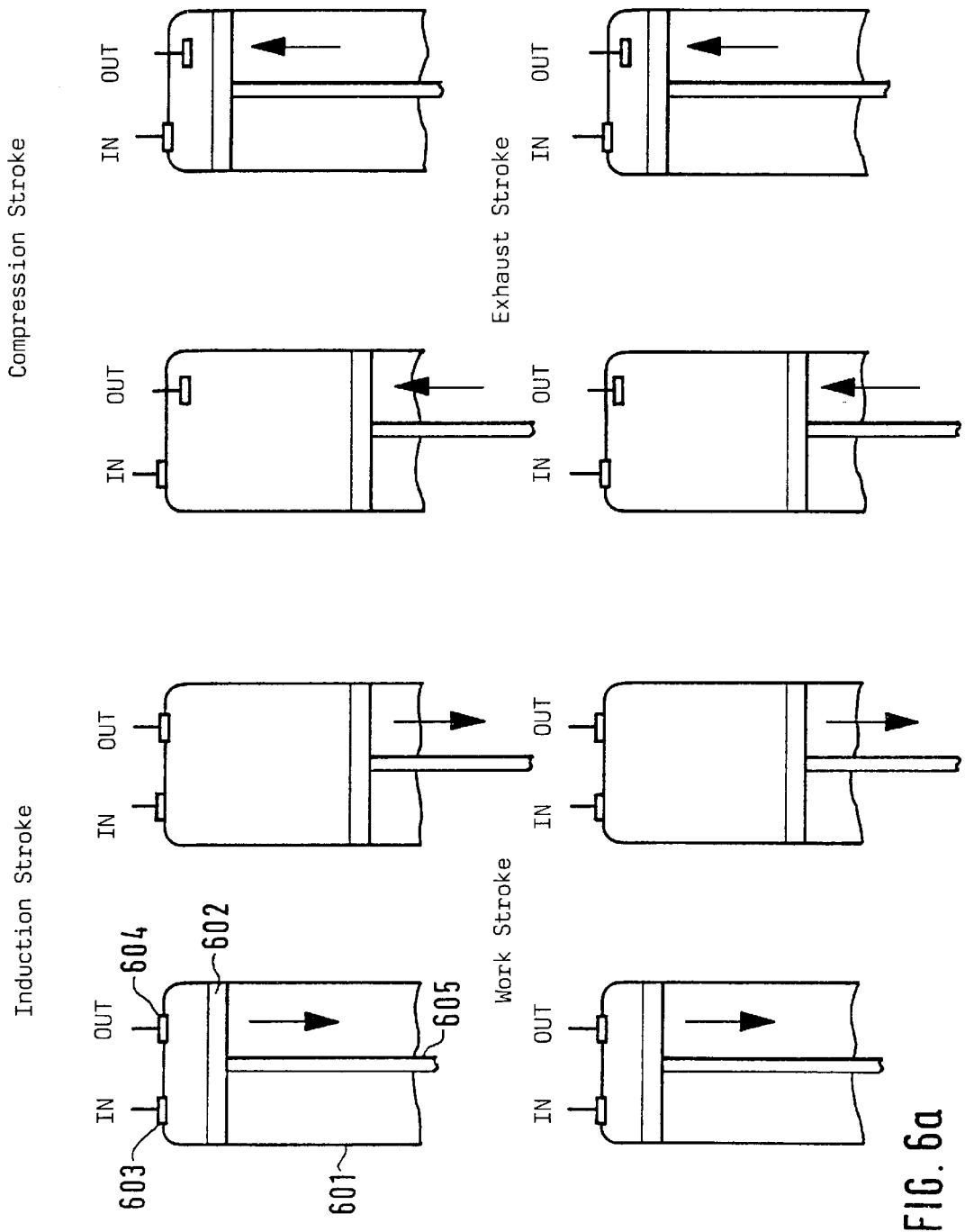

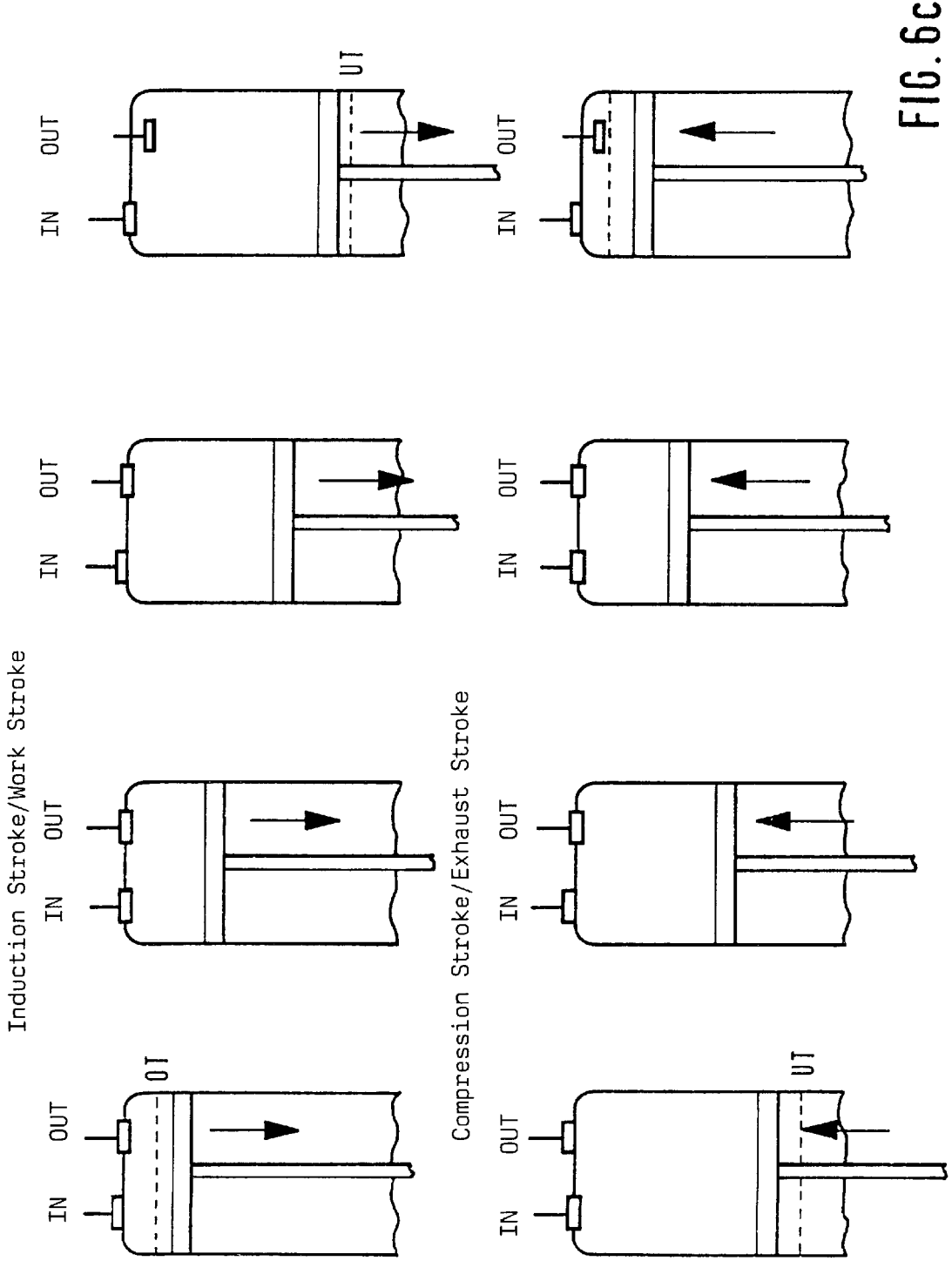

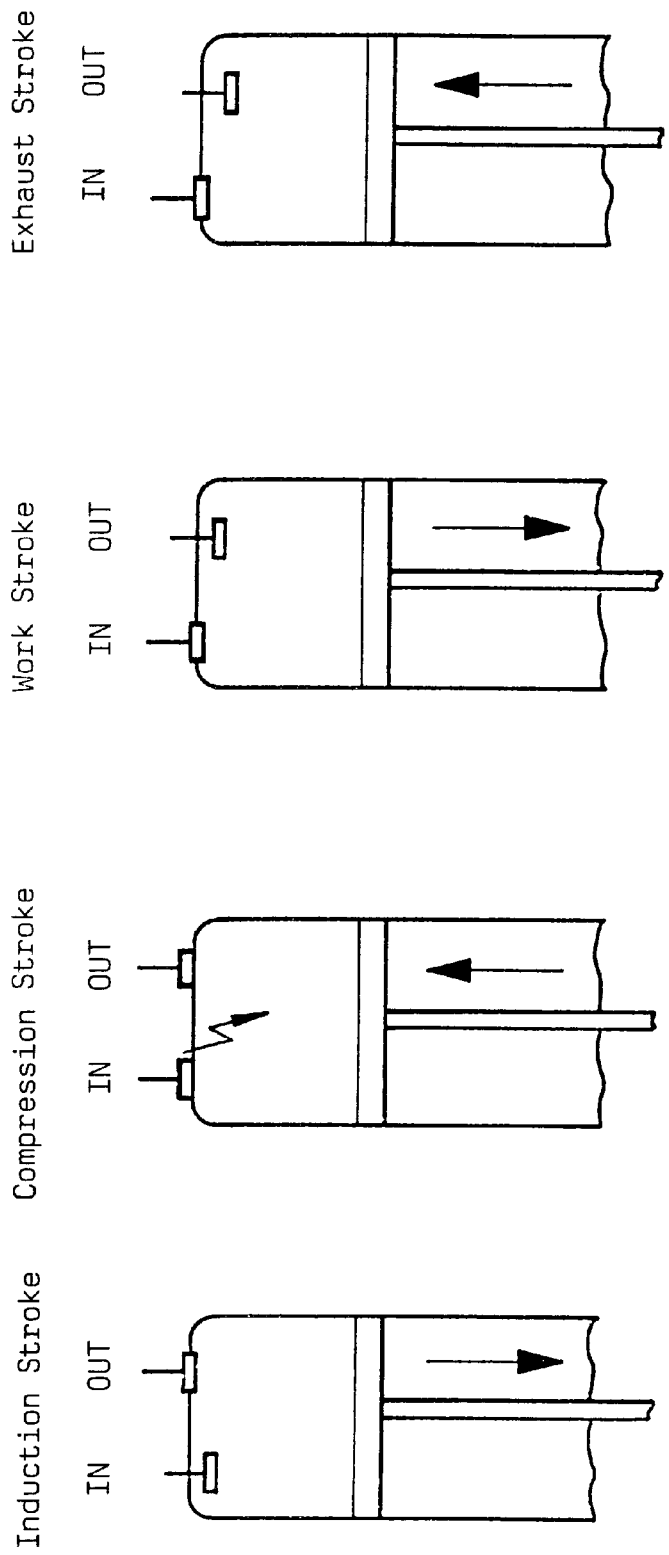

METHOD AND ARRANGEMENT FOR CONTROLLING THE INPUT TORQUE OF A TRANSMISSION

BACKGROUND OF THE INVENTION

Methods and arrangements for controlling the input torque of a transmission are disclosed, for example, in U.S. Pat. No. 4,403,527. In this patent, it is disclosed that the gear change can be configured so as to be more comfortable in conventional automatic transmissions in that the engine torque is modified during a gear change operation by intervening with respect to the engine. In this connection, it is known to reduce the metered fuel, to delay the ignition time point (late adjustment of the ignition time point), to change the charging capacity of a compressor or turbo charger or to hold open a predetermined number of valves of the drive motor. A method and arrangement for controlling the output torque of a drive of a motor vehicle is disclosed in German patent publication 4,309,903. With a change of gears of the transmission, the engine torque is controlled in such a manner that the engine rpm is control adjusted from a first value to a second value. This second value is determined from a desired value of the output torque and from the output rpm. The engine torque is especially influenced by an adjustment of the throttle flap and the ignition.

SUMMARY OF THE INVENTION

It is an object of the invention to provide measures for controlling the input torque of a transmission in order to achieve an optimal gear change.

The method of the invention is for controlling the input torque of a transmission mounted downstream of an internal combustion engine during a gear ratio changing operation of the transmission. The input torque has a value at the start of a shift operation and the input torque is decreased or increased beyond the value via pregiven measures in dependence upon mode of shifting. The method includes performing at least one of the following steps to realize at least one of the measures: actuating a device for changing the geometric characteristics of the exhaust-gas system of the engine; actuating the electromagnetic brake controlling the input torque of the transmission; switching in or switching out ancillary equipment driven by the engine; actuating the intake or exhaust valves of the engine to generate a negative combustion torque; and, if the engine is an engine having externally supplied ignition, advancing the ignition time point of the engine.

The invention is based on controlling the input torque of a transmission during a transmission ratio changing operation of the transmission. The transmission is mounted downstream of the internal combustion engine. Here, the input torque is increased or decreased by pregiven measures in dependence upon the mode of gear shifting present. The modes of gear shifting which can be present include up-shifting under load or during overrun operation and down-shifting under load or during overrun operation. The input torque is increased or decreased beyond the value present at the start of the shifting operation. The essence of the invention is that, as a measure, at least one of the following is pregiven:

(a) the actuation of a device for changing the geometric characteristics of the exhaust-gas system of the engine; and/or, (b) the actuation of an electromagnetic brake which influences the transmission input torque; and/or, (c) the switching in or switching out of ancillary equipment driven by the engine; and/or, (d) the actuation of an intake valve or an exhaust valve of the engine in the sense of generating a negative combustion torque; and/or, (e) a preadjustment (advancing) of the ignition time point in the case of an engine wherein the ignition is supplied externally.

With the measures of the invention, a rapid active adjustment of the transmission input rpm to the synchronous rpm of the new transmission gear is achieved. In addition to the conventional automatic transmissions, the active adjustment of the synchronous rpm of the new gear is especially necessary for so-called automated manual transmissions.

A device changes the geometric characteristics of the exhaust-gas system of the internal combustion engine. In an advantageous embodiment of the invention, by actuating this device, the pressure, which is caused by the exhaust gas of the engine, is changed. Here, a flap in the exhaust-gas system of the engine can serve as the device which is actuated. Such a switchable flap in the exhaust-gas system can brake more rapidly even in a gasoline engine by means of the increased exhaust-gas counter pressure. This switchable flap in the exhaust-gas system is conventional in commercial vehicles for increasing the drag torque of the engine. In this way, a rapid reduction of the transmission input rpm is achieved via the change of the pressure ratios in the exhaust-gas system of the engine as provided by the invention.

In another advantageous embodiment of the invention, it is provided that an eddy current brake, which is known per se, is used as an electromagnetic brake which influences the transmission input torque. It is especially provided by the invention that the electromagnetic brake is connected to the flywheel of the engine or to a clutch mounted between the engine and the transmission. In this embodiment, the flywheel of the engine or the clutch disc at the engine end is used as an eddy current brake. The brake end magnetic field can be switched in to support an upshifting whereby the engine is braked, that is, the transmission input rpm is reduced.

A further embodiment of the invention provides that, as ancillary equipment, a generator and/or a compressor for a climate control system is switched in or switched out. To reduce the transmission input torque or the transmission input rpm, such in-switchable ancillary equipment can be switched in which effects an additional loss torque. The opposite effect, namely a rapid increase of the transmission input rpm, can be achieved by a targeted out-switching of the switched-in ancillary equipment and therefore a reduction of the loss torque during a change of gears is achieved. The loss torque is effected by the ancillary equipment on the engine.

An especially effective possibility for actively and rapidly adjusting the transmission input rpm comprises manipulating the intake and exhaust valves of the engine in the sense of generating a negative combustion torque. In this connection, it is assumed that the engine is configured as a four-stroke engine having an induction stroke, a compression stroke, a work stroke and an exhaust stroke. The drive of the intake valve or the exhaust valve in normal operation achieves rapid and effective reduction of the engine torque, that is, of the transmission input torque and therefore of an efficient adjustment of the transmission input rpm. To achieve the above, the drive of the intake valve or the exhaust valve during normal operation (when there is no change of gears) takes place as follows:

(a) at least one exhaust-gas valve can be opened during the compression stroke with preferably the intake valve or the intake valves being closed during the induction stroke;

(b) at least one exhaust valve is opened during the work stroke;

(c) the exhaust valve or the exhaust valves can be closed during the exhaust stroke;

(d) the inlet valve or the inlet valves can be closed during the induction stroke and/or during the work stroke until shortly before reaching bottom dead center with at least one exhaust valve being opened shortly before reaching bottom dead center;

(e) the intake valve or the intake valves can be closed during the compression stroke and/or the exhaust stroke until shortly before reaching top dead center with at least one exhaust valve being opened shortly before reaching top dead center; and, (f) at least one exhaust valve can be opened during the work stroke with the ignition time point, which occurs during the compression stroke, being shifted in the sense of an advancing adjustment (which is extreme in comparison to normal operation) significantly before reaching top dead center.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
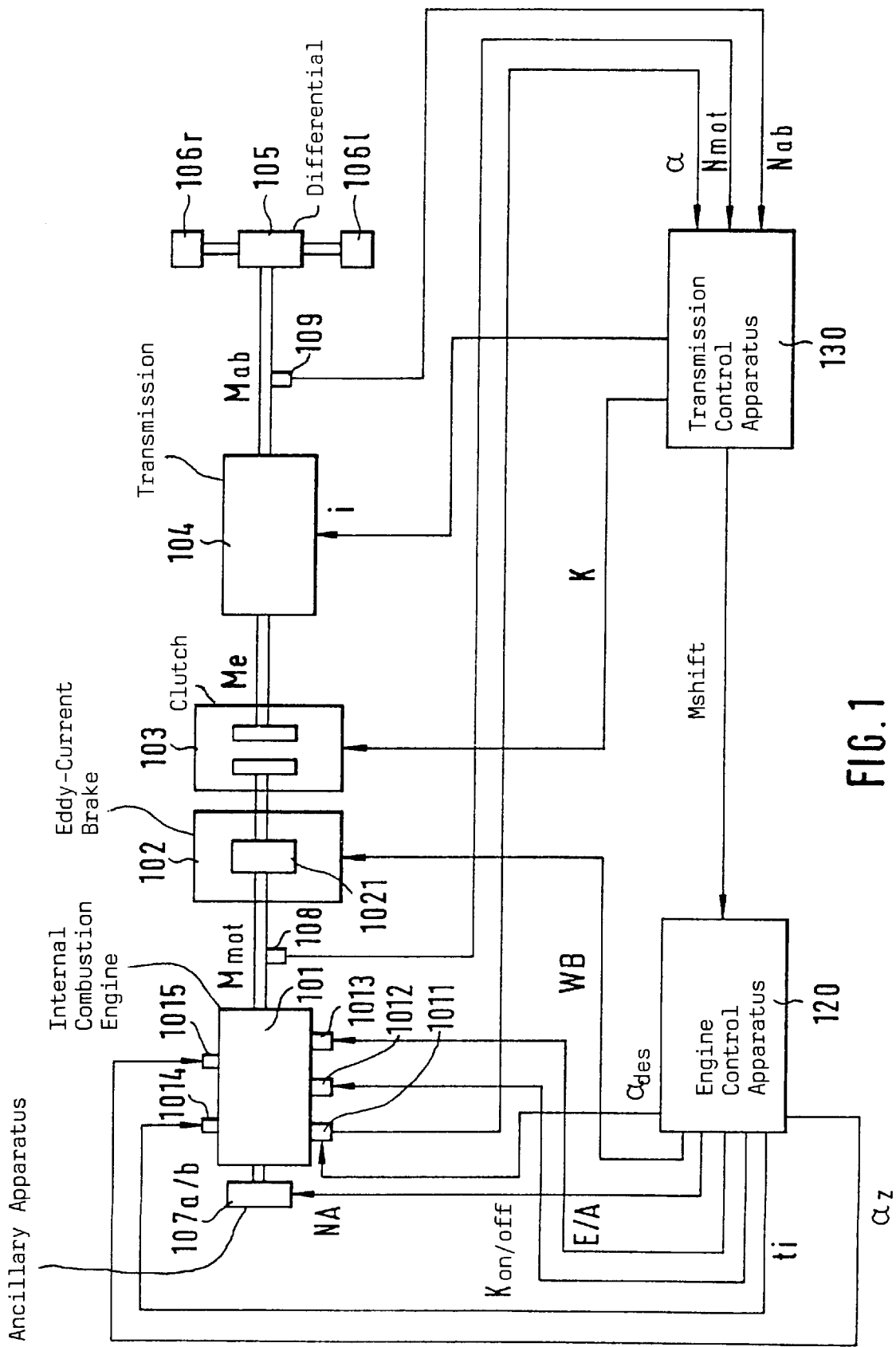
FIG. 1 is a schematic block diagram showing an embodiment of the arrangement of the invention for influencing the input torque of a transmission.

In FIG. 1, reference numeral 101 identifies an internal combustion engine having ancillary equipment 107a/b. The engine output torque Mmot (less the loss power caused by the ancillary apparatus 107a/b) is supplied to the clutch 103 via the flywheel 1021. The clutch 103, by being correspondingly controlled, can supply the engine output torque to the transmission 104 as a transmission input torque Me. The transmission output torque Mab is transmitted further to the wheels 106r/l via the differential 105.

The transmission 104 is configured as a conventional automatic transmission or as an automated manual transmission. The signal (i) coming from the transmission control apparatus 130 initiates a gear change. The transmission control apparatus 130 drives the clutch 103 with the signal K. To determine the gear change (that is, the clutch actuation), the transmission control apparatus 130 is supplied with the following: the transmission output rpm Nab (rpm sensor 109), the engine rpm Nmot (rpm sensor 108) and the engine load α (throttle flap position angle transducer 1011). The transmission control apparatus 130 is explained in greater detail with respect to FIG. 2.

What is essential for the invention in FIG. 1 is that the transmission control apparatus 130 outputs a shift torque Mshift to the engine control apparatus 120. This shift torque Mshift is adjusted in the engine control apparatus 120 via different measures according to the invention.

An adjustment of the ignition angle 1015 can be made with the signal $\alpha_z$ in order to adjust the shift torque. Furthermore, the fuel quantity can be varied by means of the signal ti or the ancillary equipment 107a/b can be switched in or switched out via the signal NA. The ancillary equipment 107a/b are driven by the engine 101. A flap in the exhaust-gas system of the engine 101 is identified by reference numeral 1012. The signal $K_{on/off}$ actuates the flap. The modification of the control of the intake and exhaust valves of the engine 101 can take place with the signal E/A. The eddy current brake 102 operates, in this embodiment, on the flywheel 1021 of the engine 101. The eddy current brake 102 can be switched on and off via the signal WB. Finally, an actuation (signal $\alpha_{des}$) of the throttle flap 101 is provided for adjusting the shift torque Mshift.

The invention is directed to measures with which the shift operation can be supported in discrete shifting automatic transmissions 104 (conventional stepped automatic or automated shift transmissions). For this purpose, the engine is controlled via a torque command, namely, the shift torque Mshift. When the transmission control 130 commands a shift (shift signal i), then this shift is carried out especially comfortably, rapidly and protectively if, at the end of the shift operation, the transmission input rpm coincides well with the synchronous rpm of the engaged gear.

In conventional discrete shifting automatic transmissions, a new transmission ratio can be adjusted and the engine can be passively brought to the then necessary synchronous rpm by the overlapping of the brakes, which are charged with pressure, and the clutches. If necessary, this matching of the rpms can be simplified via the slip at a hydrodynamic converter (not shown in FIG. 1). The adaptation of the rpms however takes a long time especially for vehicles having automatic transmissions and having a friction clutch in lieu of a hydrodynamic converter. This has as a consequence a long interruption of the tractive force and therefore a reduced shift comfort.

The measures provided by the invention are explained below in the context of embodiments. These measures are based on the idea to actively adapt the transmission input rpm (that is, the engine rpm) present at the end of the shift operation instead of passively. In this way, the desired transmission input rpm can be adjusted in a shorter time span. The transmission gear changes can be carried out more rapidly with less wear and more comfortably.

Figure 2:
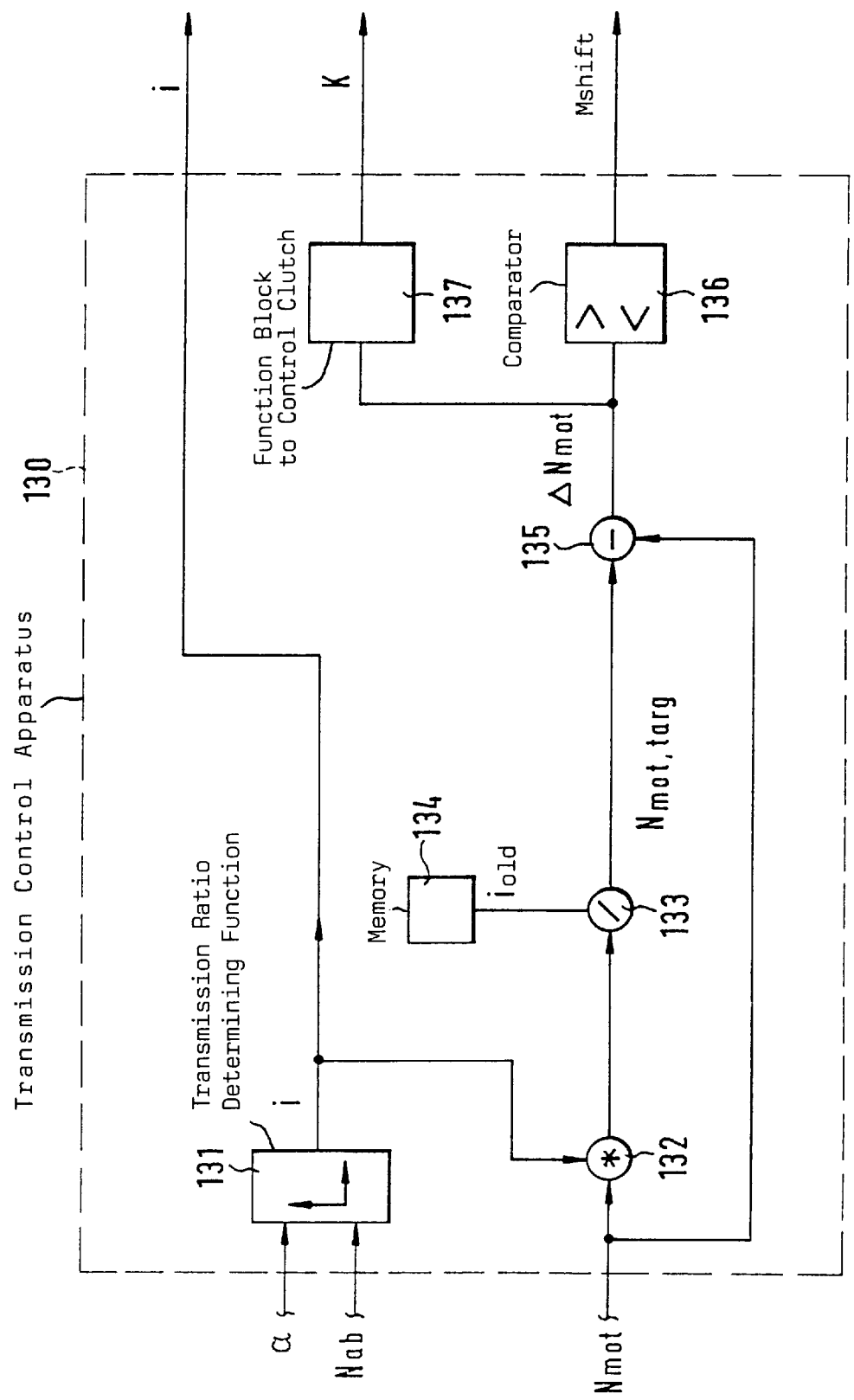
FIG. 2 is a detail schematic of the transmission control apparatus within block 130.

As shown in FIG. 2, the engine load α (throttle flap position), the transmission output rpm Nab (vehicle road speed) and the actual engine rpm Nmot are all supplied to the transmission control apparatus 130. In block 131, the particular transmission ratio (i) is determined in a manner known per se from the engine load and the transmission output rpm via one or more characteristic fields. This transmission ratio (i) is supplied to the transmission 104. A target rpm $N_{mot, targ}$ is determined from the actual engine rpm Nmot and the gear ratio difference of the actual gear ratio (i) and the desired gear ratio $i_{old}$ by means of logic elements 132 and 133. After the completed shift, the engine should rotate with this target rpm $N_{mot, targ}$. The instantaneous adjusted transmission ratio is then characterized by block 134 (memory).

In a further step, a determination is made from the difference (logic element 135) of the actual and target rpms of the engine as to whether an acceleration should take place via a positive torque or a braking operation should take place via an increased negative torque (comparator 136). At the same time, the clutch 103 can be driven by the signal K by means of the block 137 in dependence upon the difference value ΔNmot. In the case of an upshift (for example, from first gear into second gear), one needs a negative torque and, in the case of a downshift, a positive torque. In the following, this torque is referred to as the shift torque Mshift.

As long as the determination is made in block 136 that the rpm difference ΔNmot is in magnitude greater than a threshold value, then the shift torque Nshift is requested by the engine (that is, the engine control apparatus 120); otherwise, the engine control apparatus 120 does not intervene in the torque request of the engine. The adaptation of the actual engine rpm Nmot to the target rpm $N_{mot,\ targ}$, can take place via open-loop control as well as closed-loop control. For a controlled adaptation, a shift torque and the time duration is computed from the rpm difference and the inertial torques via which the shift torque should be effective. For a controlled adaptation, a fixed shift torque Mshift is requested as long as the deviation of the rpm is still too great. If the deviation is less, then there can be a switchover to a closed-loop control strategy.

In the following, measures are described with respect to FIGS. 3 to 6 as to how such positive or negative shift torque commands or requests Mshift can be realized for a more rapid adjustment of a desired rpm $N_{mot,\ targ}$ in a transmission shift operation.

Figure 3:
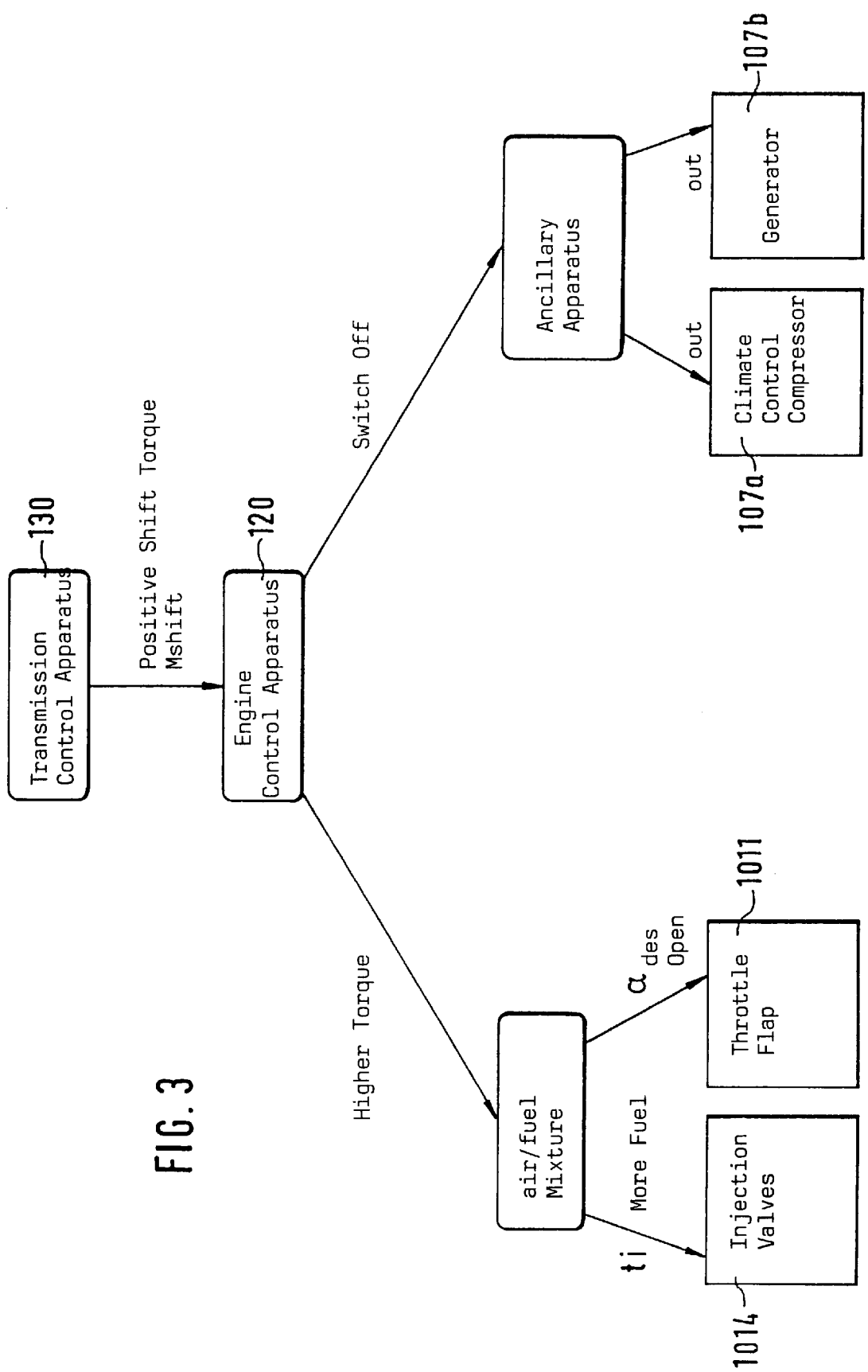
FIGS. 3, 4a, 4b and 5 show respective sets of operating flow diagrams for different torques applied to the engine; and, FIGS. 6a, 6b, 6c and 6d show different possibilities for controlling the intake valves and the exhaust valves.

FIG. 3 shows a downshift mode of gear shifting wherein the transmission control apparatus 130 transmits a positive torque request Mshift to the engine control apparatus. As reaction to the positive torque request, a specific fuel quantity can be allocated to the engine 101 for a more rapid increase in rpm. This fuel quantity leads to the generation of the requested torque. For this purpose, the injection valves 1014 are opened by signal ti longer than during normal operation (outside of shift operations) whereby more fuel is combusted. The throttle flap 1011 can be actively opened by the signal $α_{des}$ for a more rapid increase in rpm. The opening of the throttle flap then takes place, in general, to a limit which is dependent upon the driver command. Alternatively, or in addition thereto, a positive torque Mshift can be obtained in such a manner that all or specific ancillary equipment 107a/b is switched off via the drive signal NA. The ancillary equipment can be especially a compressor 107a for a climate control system and/or a current generator 107b. Provision can be made that the ancillary equipment is switched off a short time before the start of the actual shift operation in order to optimally utilize the effect of the switchoff of the ancillary equipment.

For upshifting operations having a negative torque command Mshift from the transmission control apparatus 130 (a mode of gear shifting), different embodiments of the invention can be applied in order to rapidly reduce the engine rpm (FIGS. 4a to 6).

EXAMPLE 1

In a spark-ignition engine having electronic selection of the ignition angle and variable control of the exhaust valve, the ignition angle can be advanced so far that the cylinder piston is braked in the upward movement by the counter pressure of the combustion gases. Here, a suitable quantity of ignitable mixture must be imparted to the engine which generates the requested negative shift torque without knocking occurring. Accordingly, the exhaust valve must be opened in the exhaust stroke.

EXAMPLE 2

For an engine with fully variable control of the intake and exhaust valves, an increased negative torque can be generated via compression or decompression of the cylinder volume. If compression is used for this purpose, then, for each downward movement of the piston in the cylinder, intake and/or exhaust valves must be opened. For the upward movement, all valves must be closed in order to generate a high compression. When the piston again reaches top dead center, intake and/or exhaust valves are opened in order to convert the compression work into heat. If, in contrast, the decompression is used to generate an increased negative engine torque, then, for each downward movement of the piston, the intake and/or exhaust valves must be closed in order to generate an underpressure. When the piston reaches bottom dead center, the intake and/or exhaust valves are opened in order to equalize the underpressure via inflowing air and/or exhaust gas and, in this way, convert the decompression work into heat. Here, combinations of the two modes of operation are possible. For a more precise explanation of this subject matter, reference can be made to the description of FIG. 6. In contrast to conventional valve control, and for a fully variable valve control, an additional negative torque can be generated with each revolution of the engine and not only for each second revolution.

EXAMPLE 3

The method 1 (shift of ignition angle) can be especially effectively utilized in spark-ignition engines having direct injection of the fuel. This is so because no fuel is bonded in the wall film which would delay the buildup of a negative torque via advanced ignition or which would reach the exhaust gas uncombusted.

EXAMPLE 4

An additional negative torque can, as mentioned, be generated by switching in in-switchable ancillary equipment such as the generator or the compressor for the climate control system. In order to optimally utilize such equipment, this equipment must, if required, be switched in a short time in advance of the start of the actual shift operation.

EXAMPLE 5

A switchable flap in the exhaust-gas system (as is conventional for commercial vehicles) can brake the engine more rapidly via an increased exhaust-gas counter pressure.

EXAMPLE 6

The engine can likewise be more rapidly braked via an eddy current brake at the flywheel or at the clutch disc at the engine end.

EXAMPLE 7

By suppressing injection pulses, provision can be made in a spark-ignition engine as well as in a diesel engine that at least no positive torque arises.

Figure 4A:
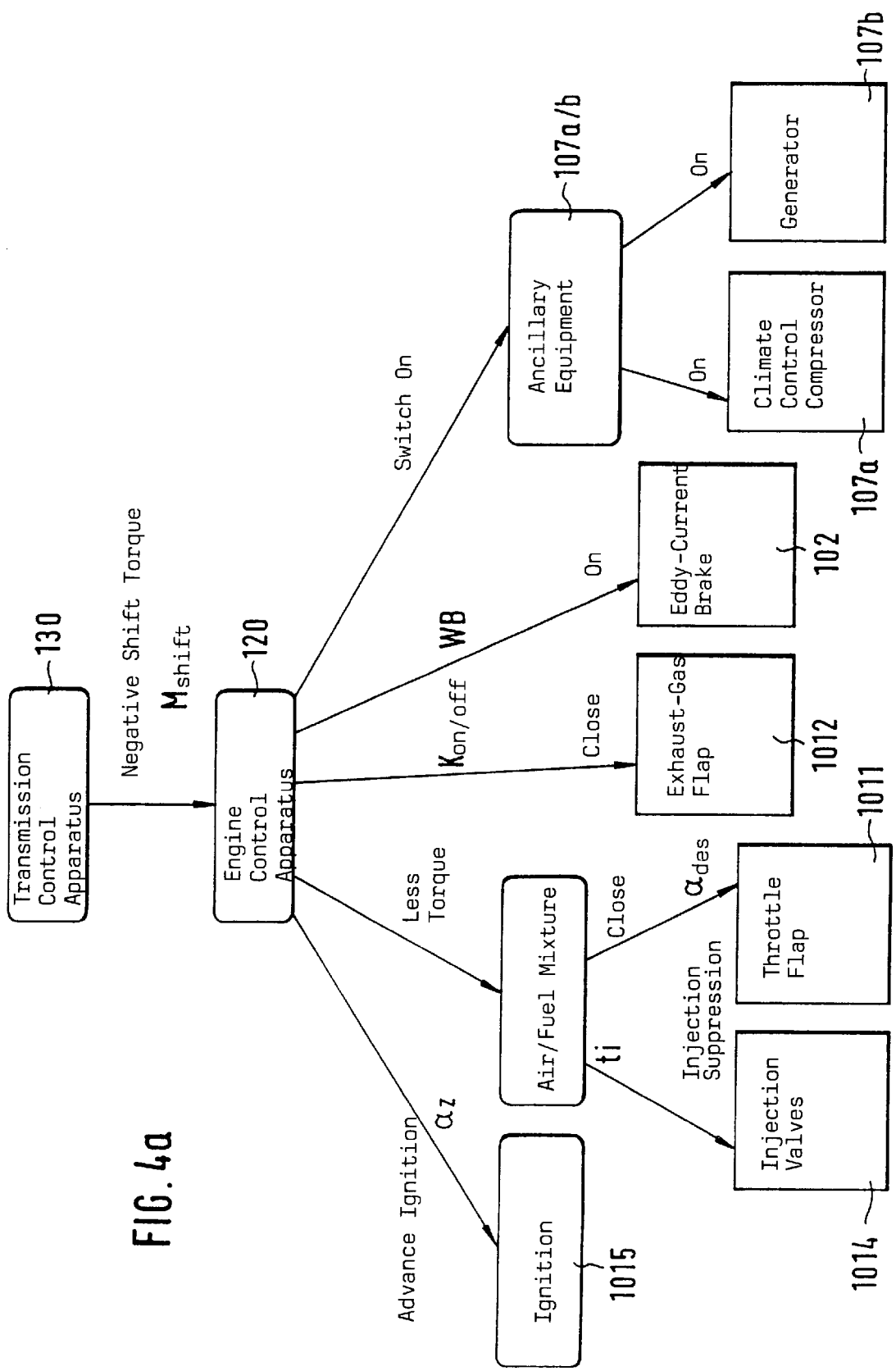
Figure 4B:
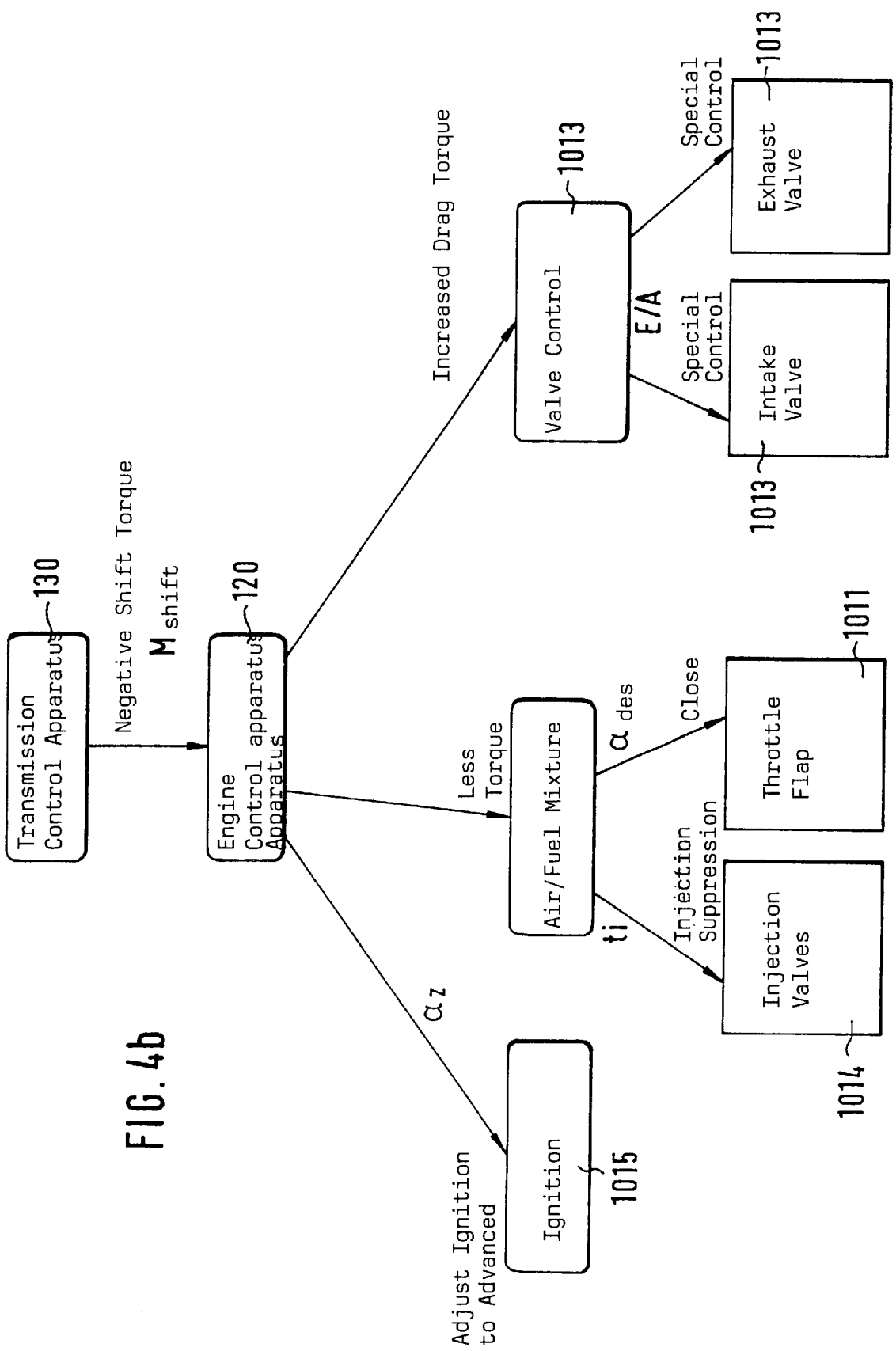
Figure 5:
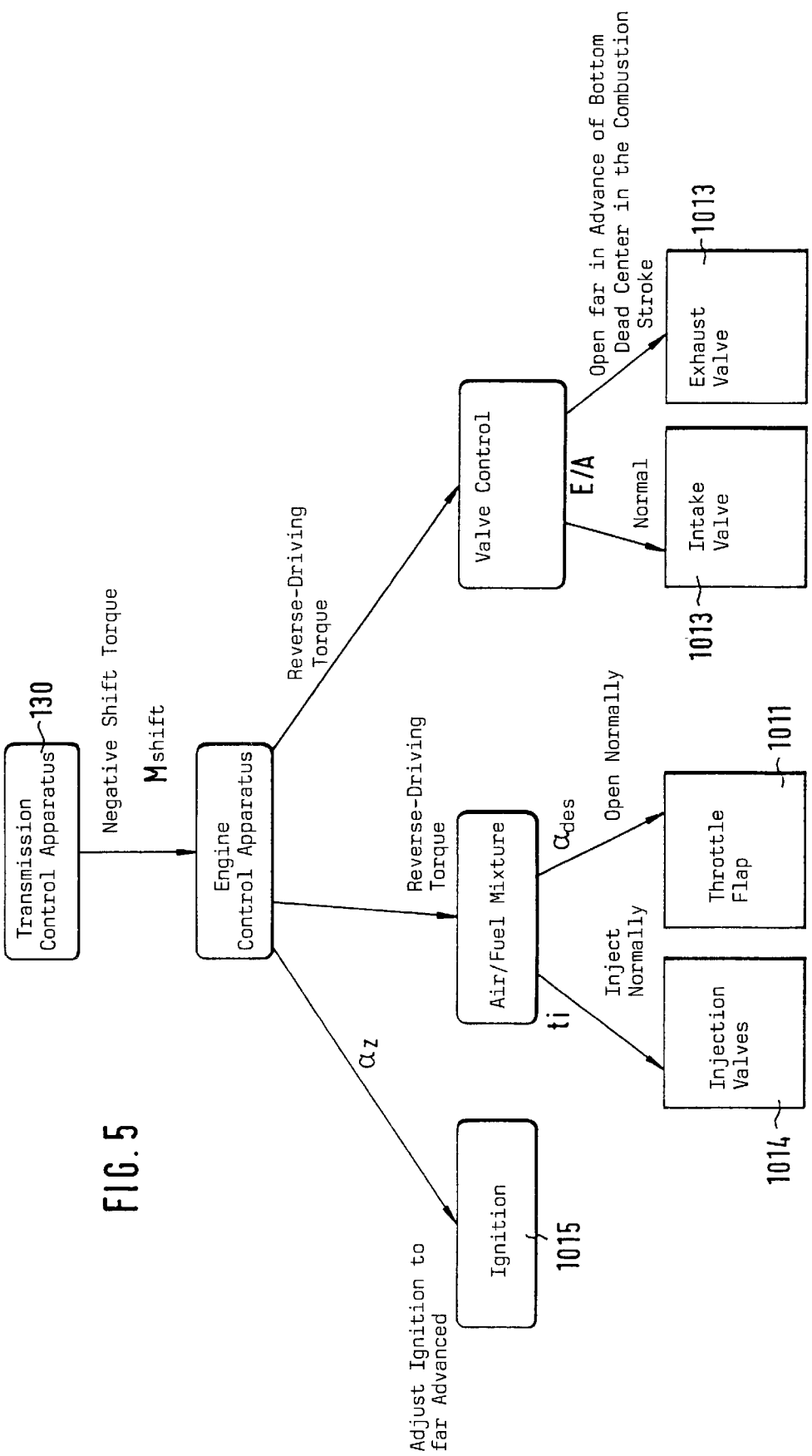

FIGS. 4a, 4b and 5 schematically show different possibilities as to how a negative shift torque Mshift can be realized.

FIG. 4a shows possibilities of obtaining a negative shift torque Mshift for upshifting operations without a valve control. If the transmission control apparatus 130 requests a support Mshift of an upshift from the engine control apparatus 120, then the ignition 1015 can be advanced via the signal $α_z$. In addition, the torque outputted by the engine can be reduced via a reduced charge. For this purpose, the injected quantity can be reduced (signals ti, injection valves 1014). For this purpose, the injection of individual cylinders can at times be completely suppressed. In addition to reducing the fuel quantity, the engine charge can be reduced in such a manner that the throttle flap is at least partially closed via the signal $\alpha_{des}$ via a corresponding throttle flap actuator 1011 known per se. Furthermore, and as already mentioned, ancillary equipment such as compressors for the climate control system or the current generator can be switched in (ancillary equipment 107a/b, drive signals NA) which effects an additional loss torque.

As shown in FIG. 4a, a flap 1012 for increasing the counter pressure of the engine is provided in the exhaust-gas system of the engine 101. The increased counter pressure is achieved in reaction to a closure of such an exhaust-gas flap (drive signal $K_{on/off}$). The increased counter pressure brakes the engine effectively. Accordingly, an exhaust-gas flap 1012 of this kind can be closed to assist an upshift.

Furthermore, the possibility is provided to utilize the flywheel 1021 of the engine 101 or the engine end clutch disc as eddy current brake 102. To assist an upshift, the braking magnetic field can be switched on (drive signal WB) whereby the engine is braked.

The above-mentioned possibilities for realizing the shift torque can be utilized in each case independently of each other or in combination.

Figure 6B:
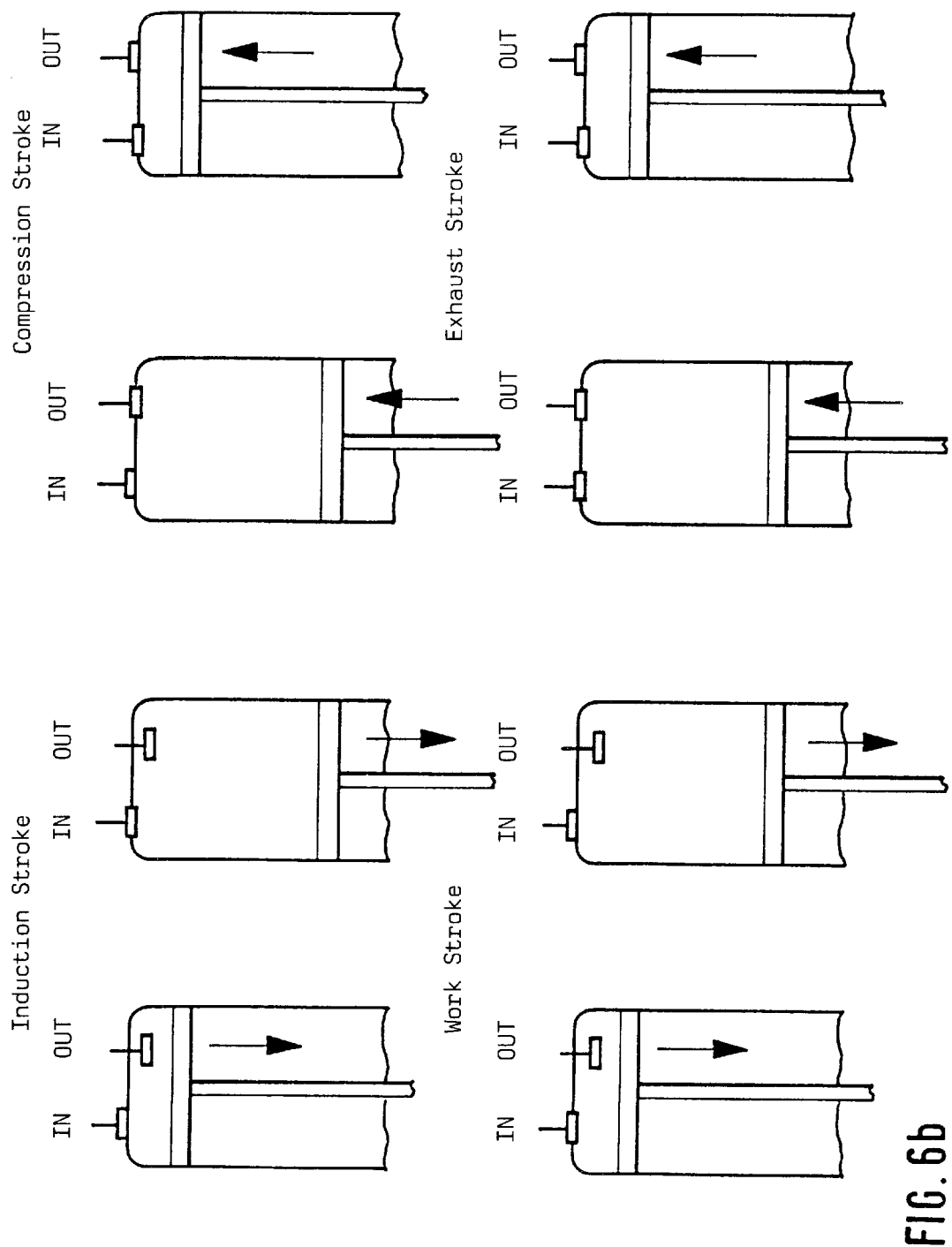

FIG. 4b shows how, for a variable valve control 1013 (drive signal E/A), a still higher negative shift torque Mshift can be generated in addition to the possibilities shown in FIG. 4a. The details for the special drive of the intake and exhaust valves are shown in FIGS. 6a, 6b and 6c. It is here emphasized that each deviation of the valve control, which takes place in normal operation (outside of shift operations), generates an increased drag torque in accordance with the measures shown in FIGS. 6a, 6b and 6c.

FIG. 5 illustrates an embodiment for generating a very high negative shift torque Mshift for spark-ignition engines. In addition to the already described interventions in the ignition and in the air/fuel mixture, an active reverse-driving torque is generated via a combustion of fuel which brakes the engine especially rapidly. The details for this are shown in FIG. 6d. Here too, the further measures shown in the previous figures for a negative shift torque can be used additionally.

FIG. 6a to 6d each show schematically a cylinder 601 of the engine 101 with the piston 602 and the piston rod 605. The charge is applied to the cylinder via the intake valve 603 and the exhaust valve 604 communicates with the exhaust-gas system.

A conventional four-stroke engine is assumed in FIGS. 6a to 6d wherein, in normal operation, an air/fuel mixture is inducted in an induction stroke by opening the intake valve 603. The exhaust valve 604 is then mostly closed. In the compression stroke, the air/fuel mixture is compressed with the intake and exhaust valves closed whereupon, in the work stroke, the piston 602 is moved downwardly by the combustion of the air/fuel mixture when the intake and exhaust valves are closed. In the exhaust stroke, the exhaust gas is discharged into the exhaust-gas system via an opening of the exhaust valve 604. In this example, the known valve overlapping controls were deliberately omitted. Furthermore, in each of FIGS. 6a to 6d, only one intake valve and one exhaust valve are shown. It is understood that several intake valves and/or several exhaust valves can be provided. Furthermore, the valve drive positions shown in FIGS. 6a to 6d only define the idea of the invention schematically. Here too, and without departing from the concept of the invention, valve overlappings can take place or an early opening or early closing of the valves can be effected.

FIG. 6a shows, for a variable valve control, how an increased drag torque can be generated by decompression. The intake and exhaust valves 603 and 604 remain closed during the induction stroke whereby a high underpressure is developed in the cylinder 601. This underpressure generates a reverse-driving torque at the crankshaft. In the compression stroke, the exhaust valve 604 is opened whereby exhaust gas flows into the cylinder 601 and the underpressure is equalized. In this way, no forward driving torque is generated during an upward movement of the piston 602 in the cylinder 601. The exhaust valve 604 must be closed at the proper time in advance of the piston 602 reaching top dead center OT in order to prevent contact by the piston and thereby avoid damage. In the work and discharge strokes, the same operation repeats whereby a negative torque integral arises for each rotation of the crankshaft.

The method described with respect to FIG. 6a is independent of the number of intake and exhaust valves. Furthermore, the method functions in the same manner when the intake valve is actuated instead of the exhaust valve. Furthermore, the method is independent of whether a spark-ignition engine or a diesel engine is used.

For spark-ignition engines, the method described with respect to FIG. 6a permits a higher drag torque than a conventional valve control when the intake valve is opened in the induction stroke as usual because, in the intake pipe, an underpressure is present because of the closed throttle flap (see FIG. 4b). Each opening of the exhaust valve in the compression stroke already effects a higher drag torque with respect to conventional valve control.

FIG. 6b shows another method as to how an increased drag torque can be generated for a variable valve control and this time via compression. Here, the exhaust valve 604 is opened in the induction stroke whereby exhaust gas flows into the cylinder 601. In the compression stroke, the intake and exhaust valves 603 and 604 are closed whereby an overpressure builds up in the cylinder 601. This overpressure leads to a reverse-driving torque. Opening the exhaust valve affords the advantage compared to the intake valve that a higher pressure is present at the exhaust end than at the intake end when the throttle flap is closed whereby the overpressure in the cylinder becomes higher. The desired reverse-driving torque can still be generated even when the intake valve is opened in the induction stroke as happens in a conventional valve control.

The valves are controlled in the same manner in the work or exhaust stroke. In this case, it is noted that the exhaust valve is only then opened when it no longer can contact the piston which is moving downwardly. At first, the overpressure escapes from the cylinder through the opened exhaust valve into the exhaust-gas system whereby the piston can generate no positive torque in the downward movement. In the further course, the exhaust gas again flows back into the cylinder through the exhaust valve in order to again be compressed in the exhaust stroke.

The method shown with respect to FIG. 6b is independent of the number of intake and exhaust valves. Furthermore, the method is independent of whether a spark-ignition engine or a diesel engine is used. The method shown with respect to FIG. 6b for generating an increased drag torque via compression affords the advantage compared to the decompression method shown with respect to FIG. 6a that the cylinder and the piston are not subjected to any special loads. In the decompression method according to FIG. 6a, a far lower underpressure however arises in the cylinder than in the usual operation with a closed throttle flap. Therefore, possibly occurring problems because of the vaporization of the engine oil or because of the unusual loading of the piston rings should be noted.

FIG. 6c shows a combination of the two methods (FIG. 6a and FIG. 6b) which generates a reverse-driving torque with each upward and downward movement of the piston in the cylinder. Here, the intake and exhaust valves are closed during the induction stroke and the piston generates an underpressure in the cylinder in the downward movement whereby a reverse-driving torque is developed. Shortly before reaching bottom dead center UT of the piston, the exhaust valve is opened for a short time whereby inflowing exhaust gas equalizes the underpressure in the cylinder. For the upward movement of the piston in the compression stroke, the exhaust gas is compressed and generates anew a reverse-driving torque. The exhaust valve is again opened for a short time sufficiently in advance of reaching top dead center OT whereby the overpressure escapes. It is to be noted here that the valve does not contact the piston which would otherwise lead to damage. In the compression and exhaust strokes, the valve control described repeats whereby a reverse-driving torque is generated in both strokes.

The method described with respect to FIG. 6c is independent of the number of intake and exhaust valves. Furthermore, the method is independent of whether a spark-ignition engine or a diesel engine is used.

If only one of the valves can be adjusted independently of the position of the crankshaft, then additional combinations of operating modes shown in FIGS. 6a, 6b and 6c are possible.

FIG. 6d shows, for a spark-ignition engine having variable valve control, how a reverse-driving torque can be generated via the pressure of combustion gases. Here, the intake valve is conventionally controlled, that is, the intake valve is opened only in the induction stroke and is otherwise held closed. However, the exhaust valve is driven differently than for the control in normal operation (outside of the shift operations). In the induction stroke, the cylinder is supplied with a specific quantity of combustible air/fuel mixture via the intake valve. The exhaust valve is closed. In the compression stroke, the mixture is compressed with closed intake and exhaust valves and, clearly before reaching top dead center OT of the piston, the mixture is ignited by a spark from a spark plug (extremely advanced ignition). The pressure of the combustion gases brakes the upward movement of the piston and so generates a strong reverse-driving torque. In the work stroke, the exhaust valve is then opened far in advance of reaching bottom dead center UT of the piston for an intake valve which continues to be closed whereby the exhaust gas, which is under high pressure, escapes and the forward-driving torque on the crankshaft greatly reduces. In the exhaust stroke, the exhaust valve remains opened while the intake valve remains closed. Now the exhaust gas is pushed out of the cylinder.

A high reverse-driving torque is developed in this manner over two complete revolutions.

It is understood that the foregoing description is that of the preferred embodiments of the invention and that various changes and modifications may be made thereto without departing from the spirit and scope of the invention as defined in the appended claims.

What is claimed is:

1. A method for controlling the input torque of a transmission mounted downstream of an internal combustion engine during a gear ratio changing operation of the transmission, said input torque having a value at the start of a shift operation and said input torque being decreased or increased beyond said value via pregiven measures in dependence upon whether an upshift or downshift takes place, the engine including an electromagnetic brake for controlling said input torque and, the method comprising performing the following step to realize at least one of said measures:

actuating the electromagnetic brake controlling said input torque of said transmission.

2. The method of claim 1, wherein said electromagnetic brake is an eddy-current brake.

3. The method of claim 2, wherein said engine includes a flywheel and/or a clutch interposed between said engine and said transmission; and, said method including the step of operating on at least one of said flywheel and said clutch for controlling the flow of force between said engine and said transmission; and, said eddy-current brake being connected to said flywheel and/or said clutch.

4. An arrangement for controlling the input torque of a transmission mounted downstream of an internal combustion engine during a gear ratio changing operation, the arrangement comprising:

means for increasing or decreasing said input torque beyond a value present at the start of a shift operation utilizing pregiven measures in dependence upon whether an upshift or downshift takes place; and, said means being configured so that at least one of said measures includes:

advancing the ignition time point of said engine if said engine is an engine having externally supplied ignition.

5. An arrangement for controlling the input torque of a transmission mounted downstream of an internal combustion engine during a gear ratio changing operation, the arrangement comprising:

means for increasing or decreasing said input torque beyond a value present at the start of a shift operation utilizing pregiven measures in dependence upon whether an upshift or downshift takes place; and, said means being configured so that at least one of said measures includes: actuating the intake valves of said engine to generate a negative combustion torque.

6. An arrangement for controlling the input torque of a transmission mounted downstream of an internal combustion engine during a gear ratio changing operation, said engine including an electromagnetic brake for controlling said input torque and the arrangement comprising:

means for increasing or decreasing said input torque beyond a value present at the start of a shift operation utilizing pregiven measures in dependence upon whether an upshift or downshift takes place; and, said means being configured so that at least one of said measures includes: actuating the electromagnetic brake controlling said input torque of said transmission.

7. The arrangement of claim 6, wherein said electromagnetic brake is an eddy-current brake.

8. The arrangement of claim 7, wherein said engine includes a flywheel and/or a clutch interposed between said engine and said transmission; and, said method including the step of operating on at least one of said flywheel and said clutch for controlling the flow of force between said engine and said transmission; and, said eddy-current brake being connected to said flywheel and/or said clutch.

9. A method for controlling the input torque of a transmission mounted downstream of an internal combustion engine during a gear ratio changing operation of the transmission, said input torque having a value at the start of a shift operation and said input torque being decreased or increased beyond said value via pregiven measures in dependence upon whether an upshift or downshift takes place, the method comprising performing the following step to realize at least one of said measures:

if said engine is an engine having externally supplied ignition, advancing the ignition time point of said engine.

10. A method for controlling the input torque of a transmission mounted downstream of an internal combustion engine during a gear ratio changing operation of the transmission, said input torque having a value at the start of a shift operation and said input torque being decreased or increased beyond said value via pregiven measures in dependence upon whether an upshift or downshift takes place, the method comprising performing the following step to realize at least one of said measures:

actuating the intake valves of said engine to generate a negative combustion torque.

11. The method of claim 10, wherein said engine is a four-stroke engine designed to have an induction stroke, a compression stroke, a work stroke and an exhaust stroke; wherein one of said measures, deviating from the normal operation outside of a transmission ratio change operation of said transmission, comprises the s step of:

actuating said intake valves or said exhaust valves so that at least one of the following conditions is present:
(a) at least one of said exhaust valves is open during the compression stroke with at least one of said intake valves being closed during the induction stroke;
(b) at least one of said exhaust valves is open during the work stroke;
(c) the exhaust valves are closed during the exhaust stroke;
(d) the intake valves are closed until shortly before reaching bottom dead center and at least one of the exhaust valves is opened shortly before reaching bottom dead center;
(f) at least one exhaust valve is opened during the work stroke with the ignition time point, which is present during the compression stroke, being adjusted in the direction of an extreme advance compared to normal operation significantly before reaching top dead center.

* * * * *